United States Patent
Peddada et al.

(10) Patent No.: US 12,225,033 B1
(45) Date of Patent: Feb. 11, 2025

(54) CONTROLLING OR AUDITING COMPLIANCE

(71) Applicant: Wells Fargo Bank, N.A., San Francisco, CA (US)

(72) Inventors: Chalam Peddada, Jersey City, NJ (US); Eric Schaust, Minneapolis, MN (US); Dhanesh Babu, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 275 days.

(21) Appl. No.: 18/155,837

(22) Filed: Jan. 18, 2023

(51) Int. Cl.
*H04L 9/40* (2022.01)

(52) U.S. Cl.
CPC .......... *H04L 63/1425* (2013.01); *H04L 63/20* (2013.01)

(58) Field of Classification Search
CPC .............................. H04L 63/1425; H04L 63/20
See application file for complete search history.

(56) References Cited

U.S. PATENT DOCUMENTS

| | | | |
|---|---|---|---|
| 10,171,310 B2 | 1/2019 | Hernandez et al. | |
| 10,521,747 B2 | 12/2019 | Warner et al. | |
| 10,872,206 B2 | 12/2020 | Snyder et al. | |
| 11,297,088 B2 * | 4/2022 | Crabtree | H04L 43/08 |
| 11,509,681 B2 * | 11/2022 | Parekh | H04L 63/1433 |
| 11,611,591 B2 * | 3/2023 | Parekh | H04L 63/1425 |
| 12,015,648 B2 * | 6/2024 | McCaffery | H04L 63/1425 |
| 12,058,162 B2 * | 8/2024 | Barzilay | G06F 16/24 |
| 12,093,389 B2 * | 9/2024 | Ermey | G06F 9/4881 |
| 2018/0018602 A1 | 1/2018 | DiMaggio et al. | |
| 2019/0190953 A1 * | 6/2019 | Feintuch | G06F 40/211 |
| 2019/0378073 A1 | 12/2019 | Lopez et al. | |
| 2020/0050620 A1 | 2/2020 | Clark et al. | |
| 2020/0184556 A1 | 6/2020 | Cella | |
| 2020/0410583 A1 | 12/2020 | Hart et al. | |
| 2020/0410590 A1 | 12/2020 | Regmi et al. | |
| 2021/0110047 A1 * | 4/2021 | Fang | G06N 20/00 |
| 2021/0133649 A1 | 5/2021 | Spoon et al. | |
| 2021/0243223 A1 * | 8/2021 | Arora | H04L 63/1491 |
| 2021/0250358 A1 | 8/2021 | Dumitru et al. | |
| 2021/0334821 A1 | 10/2021 | Berrington et al. | |
| 2022/0019624 A1 | 1/2022 | Gwozdz et al. | |
| 2022/0067825 A1 | 3/2022 | Shapiro | |
| 2022/0101221 A1 * | 3/2022 | Hari | G06F 16/285 |
| 2024/0022606 A1 * | 1/2024 | Bin Dato' Ahmad Dhman Huri | H04L 63/1433 |
| 2024/0031411 A1 * | 1/2024 | Levari | H04L 63/1416 |

FOREIGN PATENT DOCUMENTS

WO 2020205669 A1 10/2020

* cited by examiner

*Primary Examiner* — Viral S Lakhia
(74) *Attorney, Agent, or Firm* — Merchant & Gould P.C.

(57) ABSTRACT

Artificial intelligence and machine learning systems provide collection and correlation between publicly available regulatory and technology industry framework authoritative sources for proactive operational risk management, guidance, and regulatory obligation adherence. These systems can employ artificial intelligence techniques such as Robotic Process Automation, Natural Language Processing, Explication, Statistical Data Aggregation, Heuristics, and Machine Learning algorithms to perform analysis using machine understanding to identify assets or policies that warrant closer human scrutiny for governance, risk and compliance.

11 Claims, 6 Drawing Sheets

CONTROLLING OR AUDITING COMPLIANCE

BACKGROUND

Large organizations, as well as organizations that operate in highly regulated spaces, must find ways to ensure continuing compliance with a large number of rules and regulations. Often this is accomplished through use of policies and standards that are intended to be comprehensive and demonstrate ongoing alignment to industry requirements. These policies and standards should attest adherence to changing laws, rules, and regulatory obligations. Maintenance of policies and policy requirements need to evolve to keep pace with these obligations if and when they change.

Maintaining adherence to regulatory obligations are challenged by manual management of existing obligations. Such manual processes can include identification of obligation changes and reactive identification of out-of-date assets, controls, or processes. Organizations must rapidly and manually determine what changes affect which assets, across which geographies, so that the assets, controls, or processes can be updated or changed as required.

SUMMARY

Embodiments are directed to controlling or auditing compliance with rules or requirements such as regulations and industry standards.

According to a first embodiment, a compliance monitoring platform includes internal assets of an enterprise, each of the internal assets subject to at least one compliance standard. The compliance monitoring platform further includes a classification engine of the enterprise, the classification engine including a processor and a memory storing instructions which, when executed, cause the classification engine to carry out a series of actions. Those actions include collecting publicly available authoritative sources including a set of regulatory compliance rules and cyber threat intelligence information. The actions further include collecting a plurality of internal policies corresponding to the plurality of internal assets, the internal policies including a risk landscape. The compliance monitoring platform can align and cross-map the publicly available authoritative sources, the internal policies, and the internal assets; overlay the set of regulatory compliance rules with the plurality of internal policies; overlay the cyber threat intelligence information with the risk landscape; and detect a change in at least one of the available authoritative sources, the internal policies, and the assets. The compliance monitoring platform can determine an adequacy of the internal policies based on the detected change, the overlaying of the set of regulatory compliance rules with the plurality of internal policies, and the overlaying of the cyber threat intelligence information with the risk landscape. The compliance monitoring platform can then provide guided assistance for the enterprise to maintain conformance with the at least one compliance standard of each of the plurality of internal assets.

The memory can include instructions which, when executed by the processor, cause the compliance monitoring platform to continuously monitor the publicly available authoritative sources, the plurality of internal policies, and the plurality of assets to detect the change. The publicly-available authoritative sources can be periodically updated by a third party provider. The memory can further include instructions which, when executed by the processor, cause the compliance monitoring platform to automatically determine adequacy of the plurality of internal policies when certain of the publicly-available authoritative sources, the plurality of internal policies, or the plurality of internal assets of the enterprise is changed. The processor can be configured to generate a compliance check based on the adequacy when any one of the plurality of internal assets that are subject to the at least one compliance standard is modified or replaced. The compliance monitoring platform can further generate an indication of a compliance status for the one of the plurality of internal assets. The processor can further be configured to generate a compliance check based on the determination of adequacy when any one of the plurality of publicly available authoritative sources is modified. The compliance monitoring platform can generate an indication of a compliance status for internal assets when the one of the plurality of publicly available authoritative sources is modified. The compliance monitoring platform can include artificial intelligence configured to overlay the set of regulatory compliance rules with the plurality of internal policies, overlay the cyber threat intelligence information with the risk landscape, detect the change, and determine the adequacy of the plurality of internal policies.

According to another embodiment, a method as disclosed herein includes collecting a plurality of publicly available authoritative sources including a set of regulatory compliance rules and cyber threat intelligence information. The method further includes collecting a plurality of internal policies corresponding to a plurality of internal assets of an enterprise, the internal policies including a risk landscape. The method further includes aligning and cross-map the plurality of publicly available authoritative sources, the plurality of internal policies, and the plurality of internal assets. The method further includes overlaying the set of regulatory compliance rules with the plurality of internal policies, overlaying the cyber threat intelligence information with the risk landscape, and detecting a change in at least one of the plurality of publicly available authoritative sources, the plurality of internal policies, and the plurality of assets. The method includes determining an adequacy of the plurality of internal policies based on the detected change, the overlaying of the set of regulatory compliance rules with the plurality of internal policies, and the overlaying of the cyber threat intelligence information with the risk landscape. The method includes providing a guided assistance output for the enterprise to maintain conformance with at least one compliance standard that corresponds to each of the plurality of internal assets.

The method can further include providing guided assistance on a display having a real-time dashboard of the risk landscape. The real-time dashboard of the risk landscape can include multiple viewpoints ranging in specificity from a holistic enterprise-level view to an asset-level view that is specific to one of the assets of the plurality of internal assets. The method can include continuously monitoring the publicly available authoritative sources, the plurality of internal policies, and the plurality of assets to detect the change. The method can include collecting the plurality of publicly available authoritative sources and periodically receiving an update from a third party provider. The method can include automatically determining the adequacy of the plurality of internal policies when certain of the publicly-available authoritative sources, the plurality of internal policies, or the plurality of internal assets of the enterprise is changed. The method can include generating a compliance check based on the adequacy when any one of the plurality of internal assets that are subject to the at least one compliance standard is modified or replaced. The method can include generating an indication of a compliance status for the one of the plurality of internal assets. The method can include generating a compliance check based on the adequacy when any one of the plurality of publicly available authoritative sources is modified. The method can include generating an indication of a compliance status for the one of the plurality of internal assets when the one of the plurality of publicly available authoritative sources is modified.

According to another embodiment, a method includes collecting a plurality of publicly available authoritative sources including a set of regulatory compliance rules. The method includes collecting a plurality of internal policies corresponding to a plurality of internal assets of an enterprise, the internal policies including a risk landscape. The method further includes providing an artificial intelligence resource configured to align and cross-map the plurality of publicly available authoritative sources, the plurality of internal policies, and the plurality of internal assets. The method further includes providing the artificial intelligence resource configured to overlay the set of regulatory compliance rules with the plurality of internal policies. The method further includes providing the artificial intelligence resource configured to overlay the cyber threat intelligence information with the risk landscape. The method further includes detecting a change in at least one of the plurality of publicly available authoritative sources, the plurality of internal policies, and the plurality of assets. The method further includes providing the artificial intelligence resource configured to determining an adequacy of the plurality of internal policies based on the detected change, the overlaying of the set of regulatory compliance rules with the plurality of internal policies, and the overlaying of the cyber threat intelligence information with the risk landscape. The method further includes providing a guided assistance output for the enterprise to maintain conformance with at least one compliance standard that corresponds to each of the plurality of internal assets.

DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
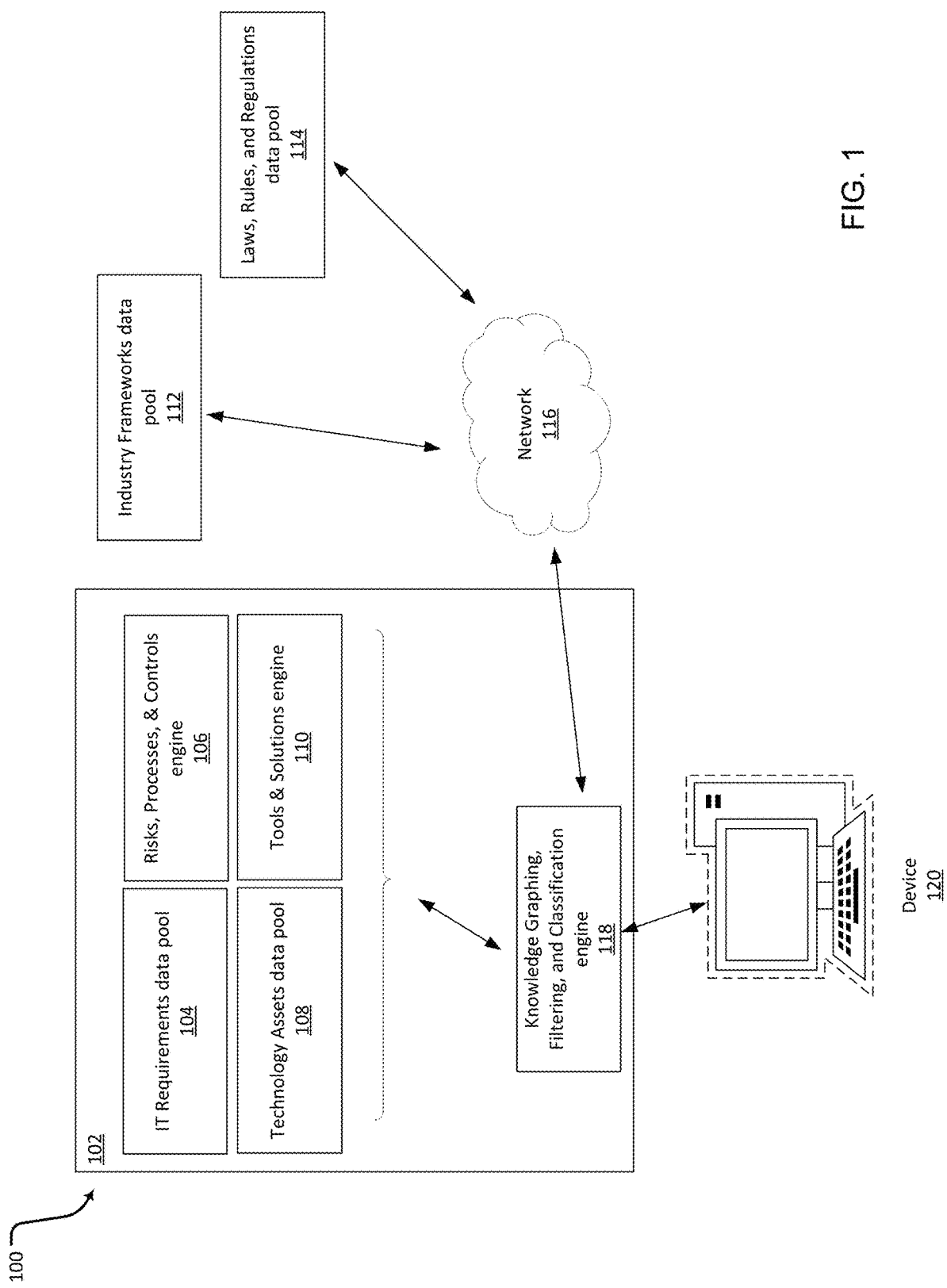
FIG. 1 illustrates logical components of a compliance system.

Embodiments are directed to controlling or auditing compliance with standards. Effective management of the dynamic operational risk environment necessitate the capabilities to proactively determine what current, and changed, laws, rules, regulations, and industry practices are relevant, demonstrate continuous compliance to those obligations, and demonstrate alignment to industry standards and best practices.

In some examples, an artificial-intelligence-based governance, risk and compliance system is disclosed herein that integrates multiple, changing and unstructured data sources, performs analysis and correlation on the data, and/or is capable of providing a real time, holistic, end to end view of enterprise risk intelligence and current regulatory compliance adherence posture. This system can enable the proactive identification of relevant policies, requirements, geographies, assets, strategic tools, risks, processes, and controls affected by a particular change and can provide guidance on changes to remain compliant despite such changes.

Artificial Intelligence (AI) and Machine Learning (ML) driven resources and associations help in both identifying the new or changing requirements and also in ensuring compliance through pre-existing solutions in the field of governance risk and compliance. This can include artificial learning to understand changes to the laws, rules, and regulations. This can also include connecting those changes to the assets of a business entity. Further, the learning can involve presenting risk and exposures for assets and assisting in mitigating those risks.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

Embodiments described herein apply an artificial intelligence resource and machine learning systems for collecting and correlating publicly available regulatory and technology industry framework authoritative sources applicable to governance, risk, and compliance data. This collection and correlation can be used to provide proactive operational risk management, guidance, and regulatory obligation adherence. Artificial intelligence techniques that are employed can include Robotic Process Automation, Natural Language Processing, Explication, Statistical Data Aggregation, Heuristics, Machine Learning algorithms, and the like. These artificial intelligence techniques can be used to perform analysis on data external to an organization such as laws, rules, regulations, and industry frameworks.

Additionally, the artificial intelligence resource, resources, or tools can consider internal organizational documents and structures such as business ontology, enterprise knowledge graphs, risk taxonomies, policies, policy requirements, technology assets, available strategic tools and solutions, risks, processes, control evaluations and metrics, and the like. Many of the internal and external sources of data are dynamic, and artificial intelligence resources can be used to understand what changes warrant closer human scrutiny for governance, risk and compliance adequacy reasons.

Systems described herein can correlate both publicly-available authoritative sources and the internal data sources (such as foundational risk components, Enterprise Data Environment (EDE), real-time System of Record (SOR) information, business ontology, enterprise knowledge graph, and risk taxonomy sources). The systems can also align and cross-map authoritative sources to key-connector industry frameworks against internal policies and policy requirements for a business entity. Systems described herein can overlay regulatory compliance composite views of associations, as well as cyber threat intelligence with the risk landscape.

These systems can thereby determine adequacy of existing processes, controls, and solutions. For example, the system could identify processes or suites of controls which are not performing effectively for traceability to identify and ingest affected policies, regulations, or information assets. These systems can also identify real-time regulatory conformance or lack thereof, and provide guided assistance that corresponds to each asset or set of assets through the spectrum of interdependent relationships between obligations, policies, requirements, assets, tools, services, risks, processes and controls to provide risk mitigation recommendations.

In an embodiment, a real-time dashboard of the risk landscape, with multiple viewpoints ranging from the holistic enterprise-level view to asset-level or actor-specific perspectives, is provided.

The examples provided herein are directed to a compliance monitoring system and methods that facilitates such monitoring throughout changes to external policies, laws, or regulations, as well as throughout changes to internal policies or procedures or changes to both digital and physical assets. In some examples, the compliance monitoring system can provide a compliance component that automates compliance monitoring throughout changes in these laws, policies, regulations, and assets.

There can be various technical advantages associated with the compliance monitoring system described herein. This compliance monitoring system can function to integrate multiple changing sets of source data and filter out instances of incorrect or inconsistent data, providing explainability using classification inferences and heuristics in real-time. This technical solution provides the practical application of allowing an enterprise operating such a compliance monitoring system to more quickly, efficiently, and accurately adjust the use or implementation of assets to remain in compliance with rules, laws, and regulations. For instance, when changes are made to a regulation or standard provided by a third party, the compliance monitoring system can provide guidance on replacing or updating a corresponding set of assets.

There are technical advantages associated with the compliance monitoring system components as well. For example, the technical problem of determining which assets are affected by a change is solved by collecting, aligning, and cross-mapping publicly available authoritative sources, internal policies, and internal assets. Further, the compliance monitoring system components can overlay the cyber threat intelligence information with the risk landscape thereby resulting in security for the enterprise operating such a compliance monitoring system that is more robust.

FIG. 1 illustrates a compliance monitoring system 100 that facilitates monitoring for compliance with internal and external rules. The compliance monitoring system 100 includes a computing device 102 having engines and data or policies of an enterprise, such as IT requirements data pool 104, risks, processes, and controls engine 106, technology assets data pool 108, and tools and solutions engine 110. Each of a series of engines or assets handled by the computing device 102 can be subject to at least one compliance standard, either set internally or externally. More or fewer computing devices than those depicted can be provided in the example compliance monitoring system 100.

IT requirements data pool 104 contains information related to the IT requirements of an enterprise. IT requirements data pool 104 can include, for example, Industrial Control Systems (ICS) requirements used to prevent harm from cyber-attacks. Other examples of information that can be stored in IT requirements data pool 104 can include integration and connection requirements, processing and performance requirements, security requirements, reporting requirements, usability requirements, function-enabling features, performance requirements, and availability requirements, for example. IT requirements data pool 104 may change over time, such as to address new threats, data transfer protocols, external laws and regulations that prescribe certain reporting or usability requirements, or internally-defined rules within an organization aspiring to certain standards in these areas. IT requirements data pool 104 can be stored in electronic storage, such as in a policy library, in embodiments. As one example, IT requirements data pool 104 can be stored in an Information Security Risk Management Tool (ISRMT).

Risks, processes, and controls engine 106 can be coordinated through an enterprise risk management system such as a Shared Risk Management Platform (SHRP). In some organizations, risks, processes, and controls engine 106 can include risks, processes, and controls that number in the thousands or tens of thousands. and may be managed by a process optimization tool. In embodiments, risks, processes, and controls engine 106 can include or manage cyber threat intelligence information collected from one or more internal or external sources. Risks, processes, and controls engine 106 may include internal processes corresponding to the plurality of internal assets, and may include a risk landscape.

An organization may have active in their enterprise risk environment thousands or tens of thousands of each: (1) risk register entries, (2) business processes, and (3) controls, all of which need to be managed. An enterprise risk management environment known to the applicant has over twelve thousand risks, over eighty thousand business processes, and over seventy thousand controls, identification and management of duplicative or sub-optimal processes and controls may be managed by a process optimization tool. For example, one process is associated to twenty different risks, with each instance of the same process having a range of two to one hundred and thirty nine controls. In another example, one risk has no associated process, but is associated to 510 distinct controls.

Technology assets data pool 108 can include information related to configurable items within an enterprise's technical assets, such as servers, software platforms, and devices. Information related to technology assets that is stored in technology assets data pool 108 can be stored in a Configuration Management Database (CMBD) to track relationships between such assets.

Tools and solutions engine 110 can be implemented in an ISRMT as well, and can handle enterprise change management processes and incident management processes. Tools and solutions engine 110 can include tools provided by third parties to an enterprise for managing risks, changes, and security.

In addition to computing device 102, compliance monitoring system 100 can include external sources that include industry frameworks data pool 112 as well as laws, rules, and regulations data pool 114. Industry frameworks data pool 112 and laws, rules, and regulations data pool 114 are not typically set, maintained, or modified by an individual enterprise that operates the compliance monitoring system 100. As described below, in embodiments these external sources can be provided from third parties. That is, in embodiments a compliance monitoring system need not include any external sources, and data from such sources can be provided either through a network (e.g., network 116) from an authoritative source or a third party.

Industry frameworks data pool 112 includes information that can vary based on the enterprise implementing the compliance monitoring system 100. In the context of a financial institution, for example, industry frameworks that are stored in the industry frameworks data pool 112 can include those set by institutions including the Federal Financial Institutions Examination Counsel or set by the Gramm-Leach Biley Act, among others. Other industry frameworks that are stored in the industry frameworks data pool 112 can be those that are standards but not enforced by law, such as standards used by Control Objectives for Information and Related Technologies (COBIT), the National Institute of Standards and Technology (NIST), or Canadian Standards Association (CSA).

There can be tens or hundreds of different rules and policies disseminated by different organizations (e.g., government entities) that are relevant specifically to financial institutions, such as the government entity called the Consumer Financial Protection Bureau (CFPB). Other rules, such as the loan originator rule and the Secure And Fair Enforcement (SAFE) Act, impact licensing of such loans. Further, the Ability To Repay/Qualified Mortgage (ATR/QM), Home Ownership and Equity Protection Act (HOEPA), TILA-RESPA Integrated Disclosure (TRID), Home Mortgage Disclosure Act (HMDA), Equal Credit Opportunities Act (ECOA) Appraisal, Higher-Priced Mortgage Loans (HPML) Appraisal, and various mortgage servicing rules, define different parameters surrounding the origination and servicing of these loans. Finally, there are policies and rules that govern the lifecycle of a loan, such as the Equal credit opportunities Act (ECOA), Credit reporting requirements Act (FCRA), and various privacy considerations. Industry frameworks data pool 112 can hold information that will implicate various different areas of the operations or assets of an enterprise that operates compliance monitoring system 100.

In addition to industry frameworks data pool 112, the other authoritative sources shown in FIG. 1 are found in the laws, rules, and regulations data pool 114. Laws, rules, and regulations data pool 114 includes information or data that can be set by statute or administrative agencies. These data correspond to authoritative sources that are typically enforceable against enterprises that do not follow them.

The authoritative sources, including both industry frameworks data pool 112 as well as laws, rules, and regulations data pool 114, can contain information, data, and policies that are subject to change. Many industry standards falling within the scope of industry frameworks that would be stored in industry frameworks data pool 112 are updated periodically, while laws, rules, and regulations data pool 114 can include information that changes at irregular intervals when new legislation or administrative rulemaking occurs in all of the jurisdictions in which the enterprise operates.

In many instances, an enterprise such as a financial institution may conduct hundreds of thousands of transactions in dozens or hundreds of jurisdictions, each having their own laws, rules, and regulations stored in laws, rules, and regulations data pool 114. At these volumes, and as the volume of transactions continues to grow, communication, network management, and computational efficiency become a logistical challenge that cannot be resolved with simple manual skill.

Moreover, identification, application, and analysis of the policies and rules applicable to each transaction, and/or the circumstances of the transaction, is an equally complex logistical challenge. This challenge grows more complex not only as a result of increasing volume, but also as a result of increasing variables as rules and policies change, or new rules and policies are implemented. For instance, there can be tens or hundreds of different rules and policies disseminated by different organizations that apply to home lending practices.

Network 116 connects the industry frameworks data pool 112 as well as laws, rules, and regulations data pool 114 to a knowledge graphing, filtering, and classification engine 118. The example network 116 is a computer network and can be any type of wireless network, wired network, and cellular network, including the Internet. Knowledge graphing, filtering, and classification engine 118 can also interface with the internal assets of the computing system 102.

In alternative embodiments, knowledge graphing, filtering, and classification engine 118 can be instantiated on a different computing device than the other internal assets of the computing system 102. For example, knowledge graphing, filtering, and classification engine 118 can be implemented on a separate computing system from computing system 102 that is also connected to network 116.

Knowledge graphing, filtering, and classification engine 118 is capable of collecting these publicly available authoritative sources. Knowledge graphing, filtering, and classification engine 118 can also collect the information regarding internal assets 102, such as IT requirements data pool 104, risks, processes and controls engine 106, technology assets data pool 108, and tools and solutions engine 110.

Knowledge graphing, filtering, and classification engine 118 can align and cross-map the authoritative sources (e.g., from both of the industry frameworks data pool 112 and the laws, rules, and regulations data pool 114) with the internal policies (e.g., those managed by the risks, processes, and controls engine 106) and the technology assets data pool 108. Knowledge graphing, filtering, and classification engine 118 can overlay this information, as well as overlaying cyber threat intelligence information (within IT requirements data pool 104) with the risk landscape (handled by risks, processes, and controls engine 106) of the compliance monitoring system 100.

A change to any of the internal assets 102 or authoritative sources (i.e., those held in industry frameworks data pool 112 as well as laws, rules, and regulations data pool 114) can cause an compliance monitoring system 100 that was formerly in compliance to fall out of compliance. Accordingly, knowledge graphing, filtering, and classification engine 118 can monitor, via network, for a change in the authoritative sources that are publicly available. Likewise, knowledge graphing, filtering, and classification engine can monitor the internal policies (i.e., policies stored within IT requirements data pool 104, or those implemented by risks, processes, and controls engine 106 and tools and solutions engine 110) as well as the technology assets 108 themselves for changes.

Upon detecting a change, knowledge graphing, filtering, and classification engine 118 can determine the adequacy of the internal policies based on that detected change. For example, if a regulation changes within those stored in laws, rules, and regulations data pool 114 that would require an increase in the time required for a certain type of data retention, then knowledge graphing, filtering, and classification engine 118 can determine whether technology assets 108 are capable of performing the change, as well as whether IT requirements 104 have been set appropriately to meet (or now implement) the updated regulation. This determination can be learned by a machine learning program or artificial intelligence algorithm. Such an algorithm can be trained with types of changes and appropriate responses. For example, changes that impact liability or that are slow for the organization to implement may be prioritized by the algorithm.

To train a machine learning model or algorithm, a group of datasets can be defined. These datasets can include external authoritative sources, internal policies, standards, assets and enterprise inventories of risks, processes. controls, assets and solutions, for example, including those described in more detail above. Each dataset can have multiple contextual dimensions and granularity levels susceptible to adaptive correlation. Training data can include both static meta-data function and potentially also dynamic classification and selection functions. This can be useful for training related to attributes and contextual information.

A correlation engine of semantic models and rules training sets can use relationships, classifications, and metadata to understand data. The algorithm can be trained with current, cleaned and selected datasets for training pipeline evaluation in a machine learning model.

As changes to external authoritative sources, internal policies, standards, assets or enterprise inventories of risks, processes. controls, assets and solutions are detected and enter the machine learning model through the inference pipeline, changes are input into the key connector framework for adaptive learning of correlations between any of the changed datasets.

To determine the adequacy of the internal policies in light of a detected change, knowledge graphing, filtering, and classification engine 118 can overlay the updated regulation (amongst the rest of the set of regulatory compliance rules) with the internal policies, and can overlay the cyber threat intelligence information with the risk landscape. Using this overlay, knowledge graphing, filtering, and classification engine 118 determines whether there is an acceptable or unacceptable level of conformity with existing or updated laws, rules, and regulations 114 as well as industry frameworks 112. Additionally, knowledge graphing, filtering, and classification engine 118 can detect scheduled future changes to laws, rules, and regulations 114 to determine a path towards compliance by that scheduled date.

The compliance monitoring system 100, and specifically the knowledge graphing, filtering, and classification engine 118, can generate a compliance check based on the adequacy of internal policies when any one of the internal assets monitored by the compliance monitoring system 100 are modified or replaced. The compliance monitoring system 100 can therefore cause the compliance monitoring platform to generate an indication of a compliance status for any one of the plurality of internal assets, either on-demand or based on such a change.

Likewise, the compliance monitoring system 100 can be configured to generate a compliance check based on the determination of adequacy when any one of the plurality of publicly available authoritative sources is modified. The compliance monitoring system 100 can cause the compliance monitoring platform to generate an indication of a compliance status for any one of the plurality of internal assets when the one of the monitored external or publicly available authoritative sources is modified.

Knowledge graphing, filtering, and classification engine 118 can provide guided assistance that corresponds to components within the compliance monitoring platform to maintain conformance with compliance standards for the internal assets 102, via device 120. The example user device 120 is a device associated with a financial institution. The user device 120 facilitates maintenance of compliance with internal and external standards. Although a single user device 120 is shown, in a typical environment the user device 120 could be one server in a server farm and/or cloud computing environment involves hundreds or thousands of computing devices.

The compliance monitoring platform described in FIG. 1, which includes the knowledge graphing, filtering, and classification engine 118 as well as the user device 120 and the internal assets 102, can monitor the publicly available authoritative sources via network 116. This monitoring of authoritative sources can include monitoring for changes in the rules and/or policies found in authoritative sources. The monitoring can be done through a push, a pull, or scheduled (periodically) over time, either independently or via a third party. For example, as third party providers make changes to the rules or policies, these changes can be continuously updated by, for example, being pushed to internal assets 102 including risks, processes, and controls 106 as each change is made. Further, the push and/or pull can be automated, near real time and/or on a periodic basis (e.g., once per hour, day, week, month, etc.). The compliance monitoring platform can also monitor the IT requirements 104 and the plurality of technology assets 108 to detect changes in a similar fashion.

Changes can also be communicated to the knowledge graphing, filtering, and classification engine 118 from a third party, such as a legal research or services company that periodically updates the enterprise regarding the status of relevant laws, rules, and regulations 114. In some instances, one or more third party providers may develop engines or other tools to address one or more of these rules and/or policies. In these instances, the third party providers are entities that are separate from the financial institution. The third party providers monitor the relevant compliance policies and generate the engines or tools to allow financial institutions to validate certain processes associated with the origination and/or servicing of loans.

For instance, DocMagic, Inc. of California is a third party provider of compliance engines for the home lending origination and servicing processes. These engines provide up-to-date compliance information for the financial institution when originating and servicing loans. This can include identifying relevant regulations and updating those regulations to generate the rules necessary for the financial institution to assess compliance.

Figure 2:
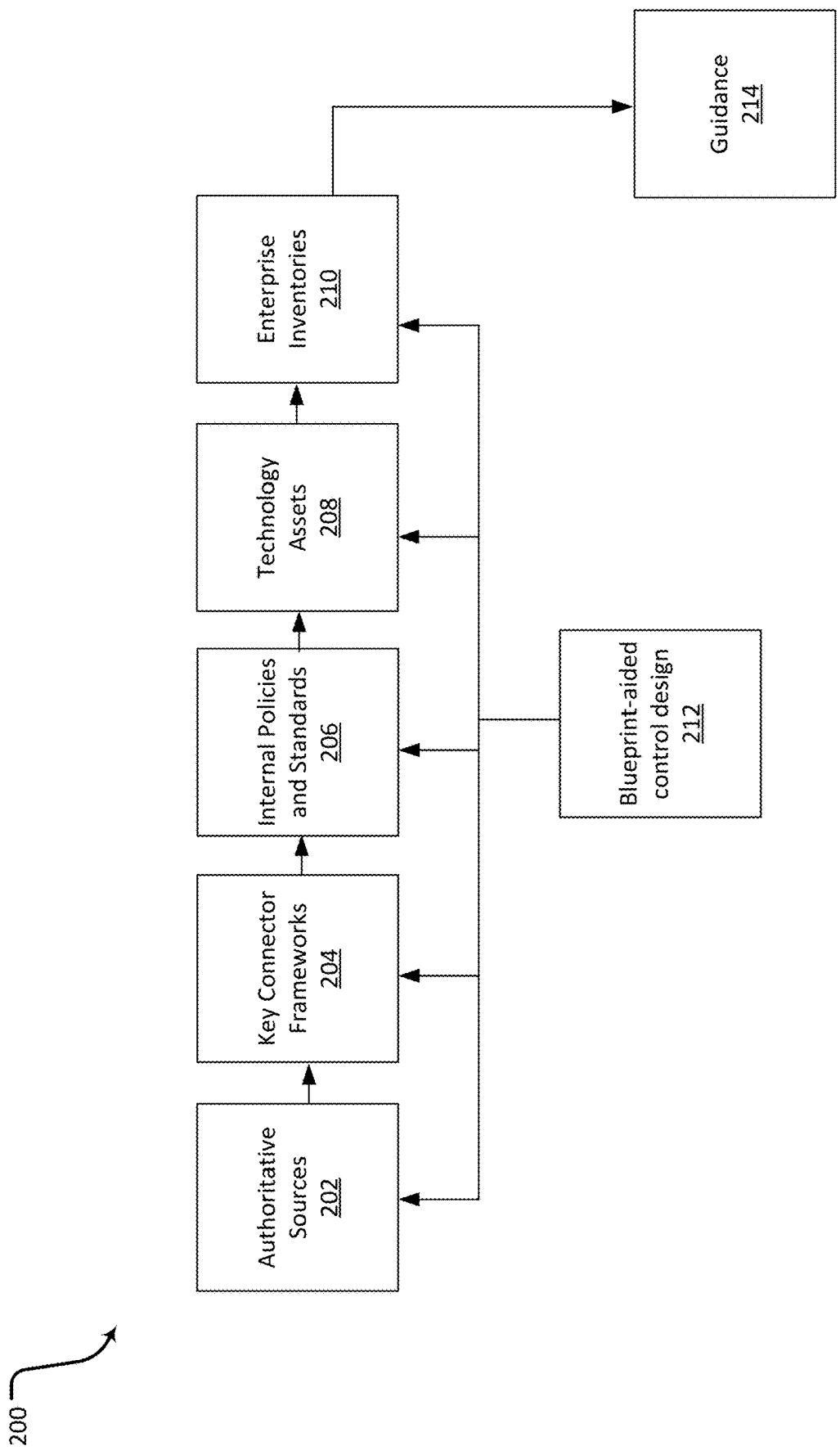
FIG. 2 illustrates an example process flow for generating guidance using a knowledge graphing, filtering, and classification engine of FIG. 1 that uses blueprint-enabled control design.

FIG. 2 illustrates an example process flow 200 for generating guidance according to a blueprint-aided control design. The starting point is authoritative sources 202, which contain varied structures and representation of data (e.g., domains, categories, subcategories, topics, subtopics, control objectives, identifier taxonomies, requirements, guidance language, etc.), which are overlayed with key connector frameworks 204. Key connector frameworks 204 forms a reference control framework of integrated, unified, and standardized nomenclature for consistent relationships alignments for many enterprises, and can be aligned to various regulatory requirements as well as other frameworks (e.g., COSO, FFIEC linked through publicly available NIST and COBIT alignments). The key connector framework includes control requirements from NIST 800 CSF Rev 5, COBIT 2019 and CSA CCM Version 4.0. This key connector framework can be aligned to a multitude of industry frameworks, handbooks, standards, and/or requirements such as FFIEC, COSO, SWIFT, PCI DSS etc., as well as regulatory standards requirements such as GDPR, GLBA, HIPPA, CCPA, FEDRAMP, SSSAE-16, etc. These key connector frameworks are then overlaid with internal policies and standards 206, technology assets 208, and enterprise inventories 210. Each time, overlaying uses blueprint-aided control design 212. Blueprint-aided control design 212 involves creating associations between multiple systems of record to enable compliance to policy and regulatory requirements. Blueprint-aided control design 212 maps consolidated framework requirements to policy requirement, controls, and enterprise solutions.

Based on the Blueprint-aided control design 212 and the overlaying described above, guidance 214 is created. Guidance 214 provides an action, path, or recommendation to the enterprise to maintain compliance with both internal and external requirements, policies, rules, laws, and regulations described above.

Figure 3:
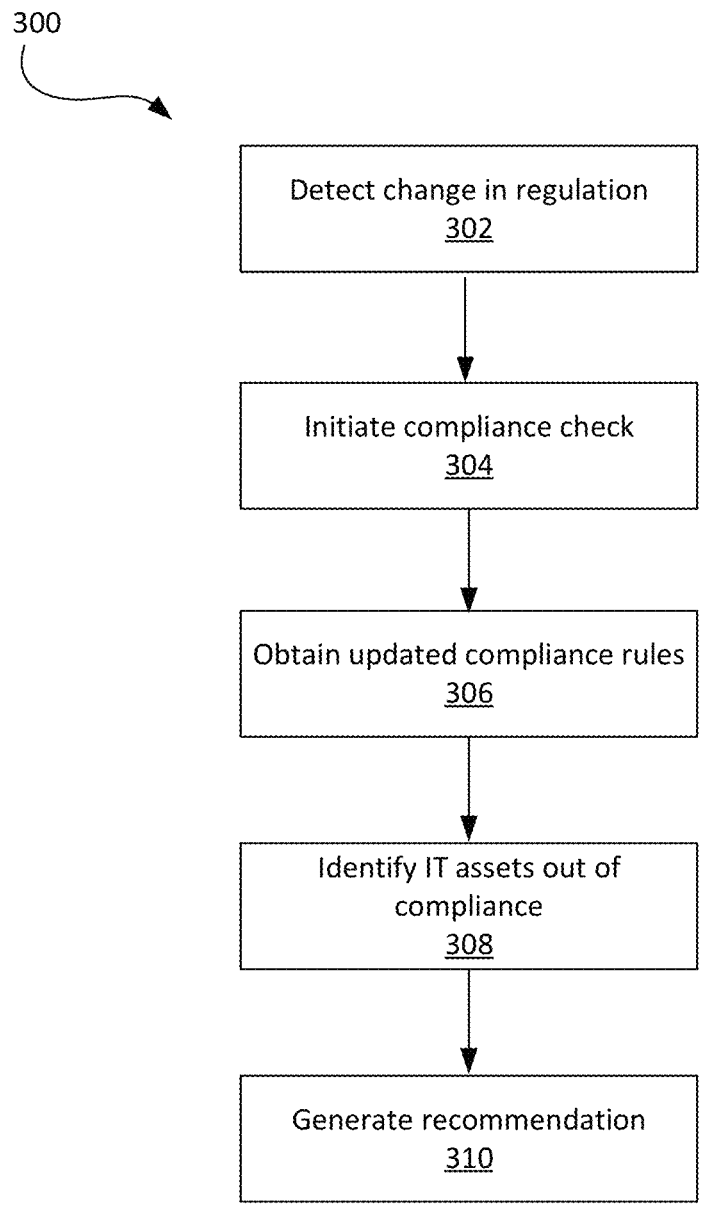
FIG. 3 illustrates an example process flow corresponding to a change in a regulation.

An example of a method 300 for providing guidance is shown in FIG. 3. Specifically, FIG. 3 illustrates a process flow corresponding to a change in a regulation. In various examples, operations illustrated in FIG. 3 may be performed by one or more components of the embodiments described herein, or by knowledge graphing, filtering, and classification engine 118 of FIG. 1 described in more detail above.

At operation 302, a change in a regulation is detected. Referring to FIG. 1, this could occur where knowledge graphing, filtering, and classification engine 118 detects, via network 116, that a regulation at 114 has changed. Alternatively, as described above, a third-party service can communicate to knowledge graphing, filtering, and classification engine 118 that the regulation has changed.

A compliance check is then initiated at operation 304. That is, in some examples, the compliance check may be initiated in response to detection of a change in the regulation associated with laws, rules, and regulations 114 in the example shown in FIG. 1.

In conjunction and/or prior to that check, updated rules and policies are either detected or obtained from third party providers at operation 306. Next, at operation 308, the compliance monitoring platform identifies IT assets therein (e.g., technology assets 108) that are out of compliance with the updated compliance rule or regulation obtained at 306. For instance, this may include determining that a level of cryptographic protection on a particular type of stored data does not meet the requirements of the new regulation. Such an operation may include ascertaining the data within technology assets 108, ascertaining one or more applicable rules or policies for that field from industry frameworks 112 or laws, rules, and regulations 114, and evaluating that data based on the applicable rules or policies.

In the specific example discussed herein, this may include determining whether the data encryption complies with (or does not comply with) the updated regulation. In instances in which other rules or policies have been updated, this may include determining whether the various technology assets 108 comply with (or does not comply with) other updated rules or policies.

Finally, at operation 310, a recommendation is generated. The recommendation can be an output on a display that suggests changes to maintain or re-establish compliance in light of the updated regulation. In some instances, the generated recommendation may be implemented automatically, or may be implemented in the absence of a user countermanding the recommendation. For example, where a new regulation requires increased frequency for generating a specific type of report from annually to every six months, the method of FIG. 3 may include simply increasing the report generation frequency to once per six months rather than merely making a passive recommendation and awaiting approval.

Whether operation 310 creates a passive recommendation or takes an action depends upon an assessed risk of implementing the change. In one embodiment, as described in co-pending application U.S. patent application Ser. No. 17/663,877 filed on May 18, 2022, (the contents of which are herein incorporated by reference in their entirety) an abstraction engine can be implemented to reduce the likelihood of a detrimental change occurring when operation 310 is carried out automatically. As further described in U.S. Ser. No. 17/663,877, a context-aware configuration framework can use artificial intelligence (such as machine learning) to drive what conditions result in calls to a compliance engine. For instance, the artificial intelligence resource can learn, over time, what conditions create exceptions, and creates future calls to the compliance engine to reduce such exceptions.

Figure 4:
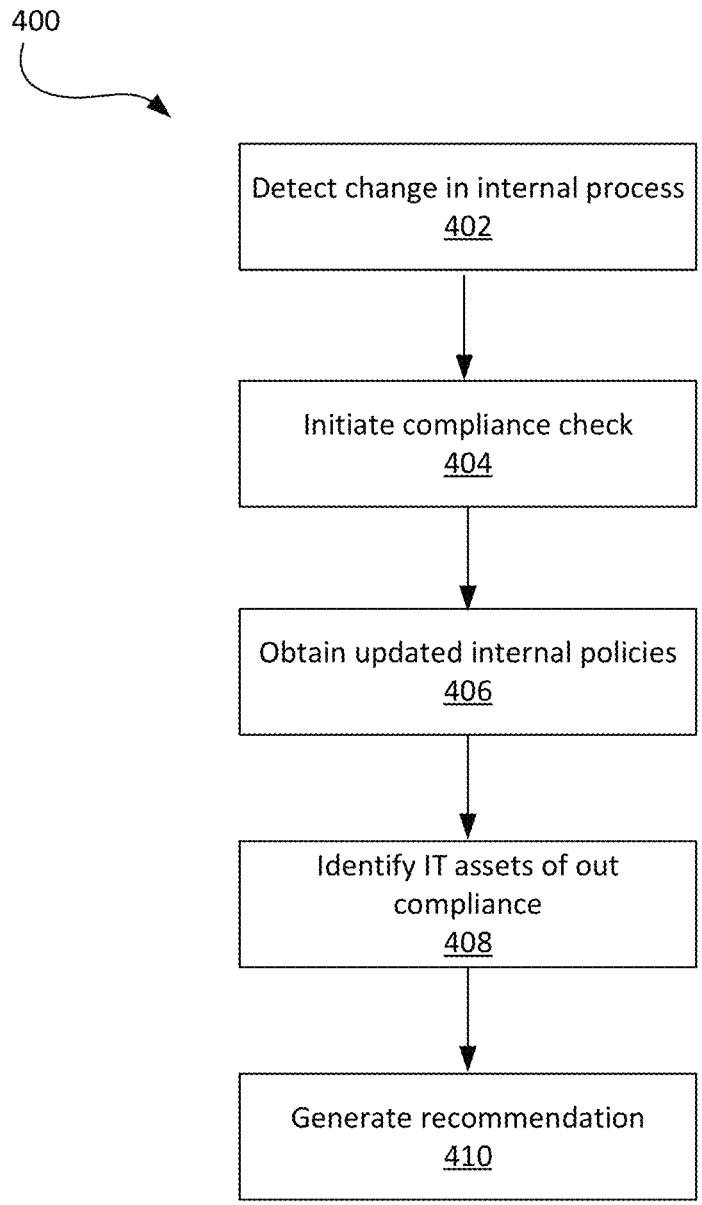
FIG. 4 illustrates another example process flow corresponding to a change in an internal policy.

FIG. 4 shows an example process flow 400 corresponding to a change in a regulation. The example process flow 400 is substantially similar to the process flow 300 except that, instead of responding to an external rules (e.g., a change in industry frameworks 112 or laws, rules, and regulations 114), the process flow 400 corresponds to a change in an internal policy.

As operation 402, an internal process change is detected. As shown in FIG. 1, knowledge graphing, filtering, and classification engine 118 is communicatively coupled to internal assets 102, including internal policies within risks, processes, and controls 106.

FIG. 4 continues through several additional operations including initiating a compliance check 404, obtaining updated internal policies 406, identifying IT assets that are out of compliance with the updated internal policies 408, and generating a corresponding recommendation 410. These steps are not described in detail because they are substantially similar to those described with respect to their counterparts in FIG. 3, with like operations having reference numbers iterated by 100 relative to that figure.

As shown in FIGS. 3 and 4, a triggering event (e.g., operations 302 and 402) can occur at any time, and involve various aspects of the enterprise's operations or from external sources. Detection of changes can therefore be carried out at regular intervals or even continuously. This detection can be based upon artificial intelligence that is trained, over time, to understand what types of changes result in compliance issues.

Figure 5:
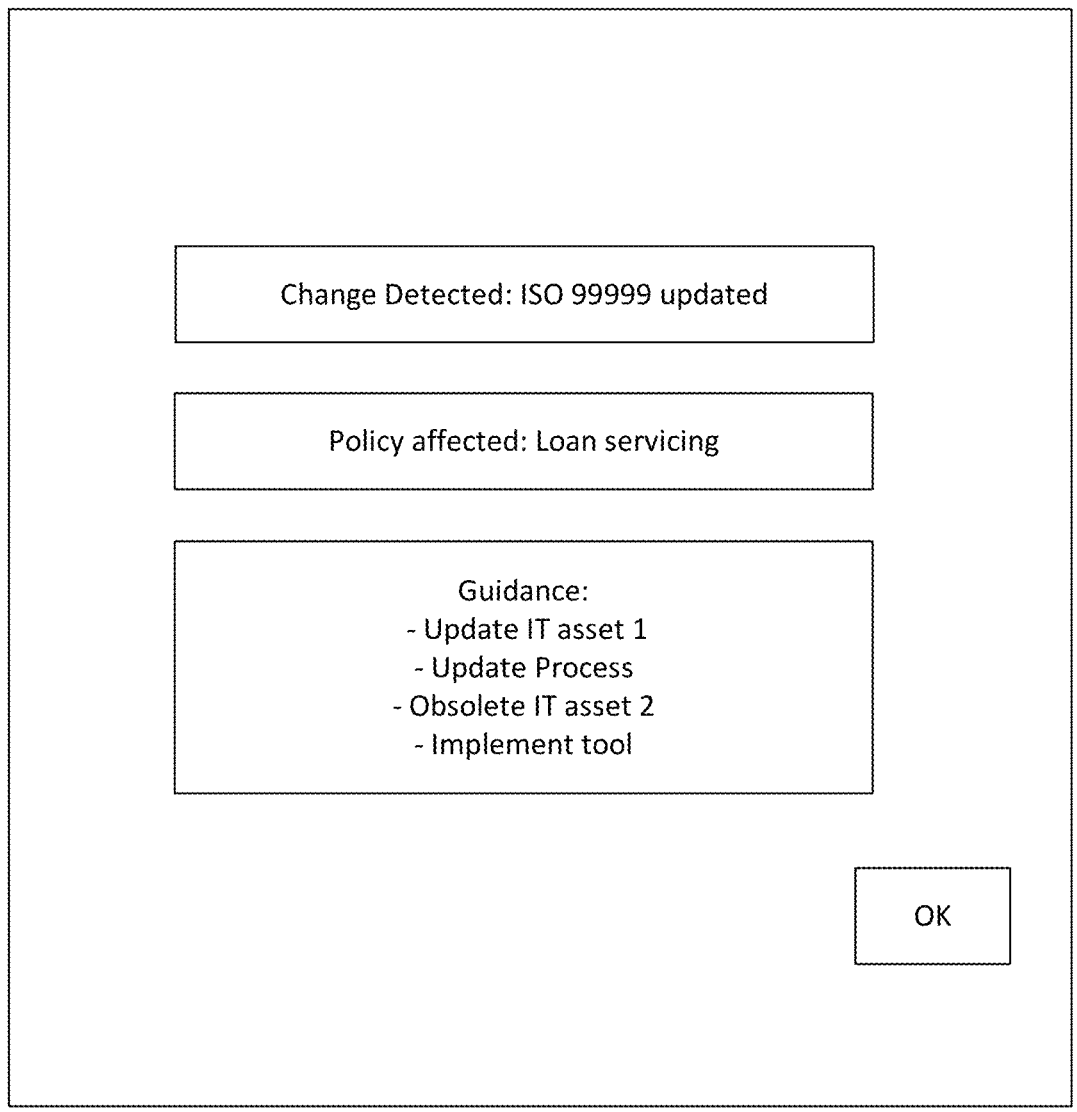
FIG. 5 depicts an example graphical user interface displaying guidance.

FIG. 5 depicts an example graphical user interface 500 displaying guidance. Graphical user interface 120 can be displayed on user device 120 of FIG. 1, or on another device on the network 116 of FIG. 1. In embodiments, the guidance provided in such a graphical user interface can include a real-time dashboard of the risk landscape. The real-time dashboard can include a plurality of viewpoints ranging in specificity from a holistic enterprise-level view to an asset-level view that is specific to one of the assets of the plurality of internal assets.

Figure 6:
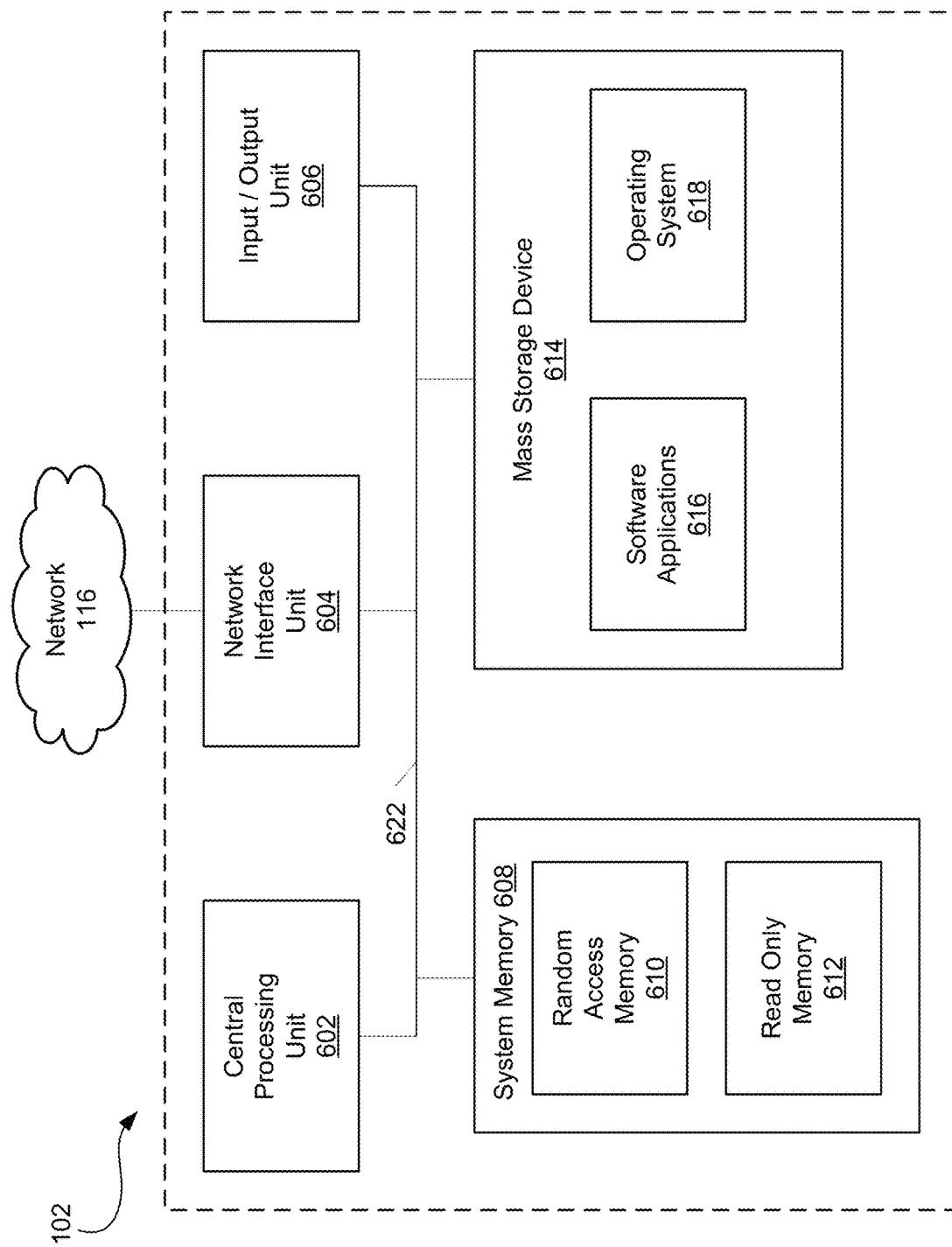
FIG. 6 illustrates example components of a computing device of FIG. 1.

FIG. 6 illustrates example components of the computing device 102 of FIG. 1. As illustrated in FIG. 1, the example computing device 102 of the compliance monitoring system 100 includes knowledge graphing, filtering, and classification engine 118, for which the hardware architecture is shown in more detail in FIG. 6. The computer hardware architecture shown in FIG. 6 can be an internally controlled and managed device (or multiple devices) of a business enterprise such as a financial institution. Alternatively, the computer hardware architecture shown in FIG. 6 can represent one or more devices operating in a shared computing system external to the enterprise or institution, such as a cloud. Further, the other computing devices disclosed herein can include the same or similar components.

Computing device 102 can include at least one central processing unit ("CPU") 602, also referred to as a processor, as well a system memory 608, and a system bus 622 that couples the system memory 608 to the CPU 602. The system memory 608 includes a random access memory ("RAM") 610 and a read-only memory ("ROM") 612. Each of these are capable of storing instructions for carrying out the technical solutions described above. A basic input/output system that contains the basic routines that help to transfer information between elements within the computing device 102, such as during startup, is stored in the ROM 612. The computing device 102 further includes a mass storage device 614. The mass storage device 614 is able to store software instructions and data. Some or all of the components of the computing device 102 are similar to those implemented in the user device 120 of FIG. 1, and any other computing devices described herein.

The mass storage device 614 is connected to the CPU 602 through a mass storage controller (not shown) connected to the system bus 622. The mass storage device 614 and its associated computer-readable data storage media provide non-volatile, non-transitory storage for the computing device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 102.

According to various embodiments of the invention, the computing device 102 may operate in a networked environment using logical connections to remote network devices through the network 116, such as a wireless network, the Internet, or another type of network. The computing device 102 may connect to the network 116 through a network interface unit 604 connected to the system bus 622. It should be appreciated that the network interface unit 604 may also be utilized to connect to other types of networks and remote computing systems. The computing device 102 also includes an input/output controller 606 for receiving and processing input from a number of other devices, including a touch user interface display screen, or another type of input device. Similarly, the input/output controller 606 may provide output to a touch user interface display screen or other type of output device.

As mentioned briefly above, the mass storage device 614 and the RAM 610 of the computing device 102 can store software instructions and data. The software instructions include an operating system 618 suitable for controlling the operation of the computing device 102. The mass storage device 614 and/or the RAM 610 also store software instructions and software applications 616, that when executed by the CPU 602, cause the computing device 102 to provide the functionality of the computing device 102 discussed in this document. For example, the mass storage device 614 and/or the RAM 610 can store software instructions that, when executed by the CPU 602, cause the computing device 102 to display received data on the display screen of the user device 120 (FIG. 1).

Embodiments of the present disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the disclosure in any way. The embodiments, examples, and details provided in this application are considered sufficient to convey possession and enable others to make and use the disclosed embodiments. The disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the disclosure and the general inventive concept embodied in this application that do not depart from the broader scope.

What is claimed is:
1. A compliance monitoring platform, comprising:
   a plurality of internal assets of an enterprise, each of the plurality of internal assets being subject to at least one compliance standard;
   a computing device including a processor and a memory, the memory storing instructions which, when executed, cause the computing device to:
      collect a plurality of publicly available authoritative sources including:
         a set of regulatory compliance rules; and
         cyber threat intelligence information;
      collect a plurality of internal policies corresponding to the plurality of internal assets, the internal policies including a risk landscape;

align and cross-map the plurality of publicly available authoritative sources, the plurality of internal policies, and the plurality of internal assets;

overlay the set of regulatory compliance rules with the plurality of internal policies;

overlay the cyber threat intelligence information with the risk landscape;

detect a change in at least one of the publicly available authoritative sources, the plurality of internal policies, and the plurality of internal assets;

determine an adequacy of the plurality of internal policies based on the detected change, the overlaying of the set of regulatory compliance rules with the plurality of internal policies, and the overlaying of the cyber threat intelligence information with the risk landscape;

provide guided assistance for the enterprise to maintain conformance with the at least one compliance standard of each of the plurality of internal assets;

generate a compliance check based on the determination of adequacy when any one of the plurality of publicly available authoritative sources is modified; and generate an indication of a compliance status for the one of the plurality of internal assets when the one of the plurality of publicly available authoritative sources is modified.

2. The compliance monitoring platform of claim 1, the memory further comprising instructions which, when executed by the processor, cause the compliance monitoring platform to monitor the publicly available authoritative sources, the plurality of internal policies, and the plurality of internal assets to detect the change.

3. The compliance monitoring platform of claim 1, wherein the plurality of publicly available authoritative sources is periodically updated by a third party provider.

4. The compliance monitoring platform of claim 1, the memory further comprising instructions which, when executed by the processor, cause the compliance monitoring platform to automatically determine adequacy of the plurality of internal policies when certain of the publicly available authoritative sources, the plurality of internal policies, or the plurality of internal assets of the enterprise is changed.

5. The compliance monitoring platform of claim 1, comprising further instructions which, when executed by the processor, cause the compliance monitoring platform to provide artificial intelligence to overlay the set of regulatory compliance rules with the plurality of internal policies, overlay the cyber threat intelligence information with the risk landscape, detect the change, and determine the adequacy of the plurality of internal policies.

6. A method comprising:

collecting a plurality of publicly available authoritative sources including:

a set of regulatory compliance rules; and cyber threat intelligence information;

collecting a plurality of internal policies corresponding to a plurality of internal assets of an enterprise, the internal policies including a risk landscape;

aligning and cross-map the plurality of publicly available authoritative sources, the plurality of internal policies, and the plurality of internal assets;

overlaying the set of regulatory compliance rules with the plurality of internal policies;

overlaying the cyber threat intelligence information with the risk landscape;

detecting a change in at least one of the plurality of publicly available authoritative sources, the plurality of internal policies, and the plurality of internal assets;

determining an adequacy of the plurality of internal policies based on the detected change, the overlaying of the set of regulatory compliance rules with the plurality of internal policies, and the overlaying of the cyber threat intelligence information with the risk landscape;

providing a guided assistance output for the enterprise to maintain conformance with at least one compliance standard that corresponds to each of the plurality of internal assets;

generating a compliance check based on the adequacy when any one of the plurality of publicly available authoritative sources is modified; and generating an indication of a compliance status for the one of the plurality of internal assets when the one of the plurality of publicly available authoritative sources is modified.

7. The method of claim 6, further comprising providing guided assistance on a display having a real-time dashboard of the risk landscape.

8. The method of claim 7, wherein the real-time dashboard of the risk landscape includes a plurality of viewpoints ranging in specificity from a holistic enterprise-level view to an asset-level view that is specific to one of the assets of the plurality of internal assets.

9. The method of claim 6, further comprising continuously monitoring the publicly available authoritative sources, the plurality of internal policies, and the plurality of internal assets to detect the change.

10. The method of claim 6, wherein collecting the plurality of publicly available authoritative sources comprises periodically receiving an update from a third party provider.

11. The method of claim 6, further comprising automatically determining the adequacy of the plurality of internal policies when certain of the publicly available authoritative sources, the plurality of internal policies, or the plurality of internal assets of the enterprise is changed.

\* \* \* \* \*

UNITED STATES PATENT AND TRADEMARK OFFICE
CERTIFICATE OF CORRECTION

PATENT NO. : 12,225,033 B1
APPLICATION NO. : 18/155837
DATED : February 11, 2025
INVENTOR(S) : Peddada et al.

Page 1 of 1

It is certified that error appears in the above-identified patent and that said Letters Patent is hereby corrected as shown below:

In the Claims

Column 16, Line 39, Claim 8: after "one" delete "of the assets".

Signed and Sealed this
Eighth Day of April, 2025

Coke Morgan Stewart
*Acting Director of the United States Patent and Trademark Office*